US008474867B2

(12) United States Patent
Nebel

(10) Patent No.: US 8,474,867 B2
(45) Date of Patent: Jul. 2, 2013

(54) STEERING WHEEL UNIT

(75) Inventor: Raimund Nebel, Obermeitingen (DE)

(73) Assignee: Autoliv Development AB, Vargarda (SE)

( * ) Notice: Subject to any disclaimer, the term of this patent is extended or adjusted under 35 U.S.C. 154(b) by 91 days.

(21) Appl. No.: 13/140,318

(22) PCT Filed: Dec. 4, 2009

(86) PCT No.: PCT/EP2009/008647
§ 371 (c)(1),
(2), (4) Date: Jul. 5, 2011

(87) PCT Pub. No.: WO2010/078896
PCT Pub. Date: Jul. 15, 2010

(65) Prior Publication Data
US 2012/0098241 A1 Apr. 26, 2012

(30) Foreign Application Priority Data
Dec. 17, 2008 (DE) .................... 10 2008 062 421

(51) Int. Cl.
*B60R 21/203* (2006.01)
(52) U.S. Cl.
USPC ............. 280/731; 200/61.54; 280/728.2
(58) Field of Classification Search
USPC ............. 200/61.54–61.57; 280/728.2, 731
See application file for complete search history.

(56) References Cited

U.S. PATENT DOCUMENTS

| 5,228,362 | A | * | 7/1993 | Chen et al. | 74/552 |
|---|---|---|---|---|---|
| 5,235,146 | A | * | 8/1993 | Suzuki | 200/61.54 |
| 5,333,897 | A | * | 8/1994 | Landis et al. | 280/728.2 |
| 5,380,037 | A | * | 1/1995 | Worrell et al. | 280/728.2 |
| 5,383,682 | A | * | 1/1995 | Nagata et al. | 280/777 |
| 5,508,482 | A | * | 4/1996 | Martin et al. | 200/61.55 |
| 5,588,666 | A | * | 12/1996 | Numata | 280/728.2 |
| 5,593,178 | A | * | 1/1997 | Shiga et al. | 280/731 |
| 5,627,352 | A | * | 5/1997 | Suzuki et al. | 200/61.54 |
| 5,755,458 | A |  | 5/1998 | Donovan |  |
| 6,139,051 | A | * | 10/2000 | Fujita | 280/731 |
| 6,508,485 | B2 | * | 1/2003 | Kikuta et al. | 280/728.2 |
| 6,688,637 | B2 | * | 2/2004 | Igawa et al. | 280/728.2 |
| 6,688,638 | B2 |  | 2/2004 | Schutz |  |

(Continued)

FOREIGN PATENT DOCUMENTS

| DE | 196 25 722 A1 | 1/1998 |
|---|---|---|
| DE | 200 17 527 U1 | 2/2001 |
| DE | 103 61 574 A1 | 7/2005 |
| EP | 0823362 | 2/1998 |

*Primary Examiner* — Eric Culbreth
*Assistant Examiner* — Laura Freedman
(74) *Attorney, Agent, or Firm* — Harness, Dickey & Pierce, P.L.C.

(57) ABSTRACT

A steering wheel unit with an airbag module and a steering wheel body is connectable to a steering column defining the axial direction. The steering wheel body includes an accommodation for the airbag module in the hub area. The airbag module can be pressed down against the steering wheel body against the force of at least one spring and at least two positioning units act between the airbag module and the steering wheel body. The positioning units are arranged in a center of gravity plane being perpendicular to the axial direction. In order to provide an easy mountability and a high degree of flexibility in respect of the installation space, the positioning units act at least in non-axial direction and the at least one spring is spaced from the positioning units.

9 Claims, 6 Drawing Sheets

U.S. PATENT DOCUMENTS

| | | | |
|---|---|---|---|
| 7,097,197 B2 * | 8/2006 | Keutz et al. | 280/728.2 |
| 7,173,202 B2 * | 2/2007 | Tsujimoto et al. | 200/61.54 |
| 8,087,691 B2 * | 1/2012 | Nebel et al. | 280/731 |
| 2002/0043786 A1 | 4/2002 | Schutz | |

* cited by examiner

STEERING WHEEL UNIT

CROSS-REFERENCE TO RELATED APPLICATIONS

This application is a U.S. National Stage Application of International application No. PCT/EP2009/008647, filed Dec. 4, 2009, and published in English as WO/2010/078896 on Jul. 15, 2010. This application claims the benefit of German Application No. 10 2008 062 421.7. The disclosures of the above applications are incorporated herein by reference.

TECHNICAL FIELD OF THE INVENTION

The invention relates to a steering wheel unit according to the preamble of Claim 1.

In almost every modern motor vehicle, an airbag module is located in the hub area of the steering wheel for the protection of the driver. The airbag, located in a housing, breaks through a cover which covers the housing when the associated gas generator is triggered and inflates between the steering wheel and the driver. Often the cover also serves as an operating surface for the horn, so that it can be pressed down basically in axial direction (in relation to the steering column) against the steering wheel body. Two basic concepts are known in this respect:

In the case of the so-called "floating cover" concept, the housing of the airbag module is rigidly connected to the steering wheel body and the cover can be pressed down in the direction of the steering wheel body and therefore also of the housing.

In the case of the so-called "floating module" concept, cover and housing are rigidly connected with each other and form the airbag module, which can be pressed down against the steering wheel body as a complete unit. In a frequently encountered design, compression springs are located between the floor of the housing and the floor of the recess of the steering wheel body in which the airbag module is located, against whose force the airbag module can be pressed down. Furthermore, positioning units are provided which position the housing in relation to the steering wheel body, whereby the positioning components on the module side are frequently located on the housing floor and the positioning components on the steering wheel side are frequently located on the floor of the recess. The principle of such an arrangement is shown in FIG. 13.

It has become clear that in such an arrangement relatively strong springs must be provided in order to avoid rattling noises during travel. However, the disadvantage of using strong springs is that a correspondingly high degree of force is required in order to operate the horn.

PRIOR ART

Generic patent EP 0823362B1 therefore proposes that both the positioning units and the springs should be provided in the plane of the centre of gravity of the airbag module. In this arrangement, the compression springs are each arranged coaxially around a guide pin, which primarily serves for axial positioning. This results in "positioning and spring units". The necessary arrangement is rather complicated and correspondingly time-consuming and costly as regards assembly and also requires a relatively large amount of space at one location when mounted.

SUMMARY OF THE INVENTION

Based on this, the present invention sets itself the problem of improving a steering wheel unit of the generic type in such a way that it is simpler to mount and more variable as regards the space which is required.

This problem is solved by means of a steering wheel unit with the characteristics of Claim 1.

With regard to the invention it was recognised that it is sufficient to arrange the positioning units which act in non-axial direction in the plane of the centre of gravity. The position of the springs is not important, so that they are spaced from the positioning units.

By means of this arrangement, on the one hand flexibility is gained, as the non-axially acting positioning units and the springs can be located on different positions. Furthermore, the concept can be implemented with a lower number of components, which means that the assembly efforts and costs therefore are clearly reduced.

In a preferred embodiment according to Claim 3, each positioning means defines the position of the airbag module in relation to steering wheel body in precisely one first non-axial direction, while it does not define the position in a second non-axial direction which stands perpendicular to the first direction. This has, in particular when three positioning units are present in accordance with Claim 2, the special advantage that a movement of the airbag module in the non-axial plane can be completely eliminated, which very much promotes the desired effect.

Still further preferred according to Claim 7 the positioning units also serve for the axial positioning. This leads to a reduced number of components needed.

A particularly simple assembly capability can be achieved by means of a steering wheel unit with the additional features of Claim 9.

Further preferred embodiments of the invention result from the further subclaims, and also from the embodiments described in more detail below with reference to the drawings.

First the state of the art will be described with reference to FIG. 13.

Figure 13:
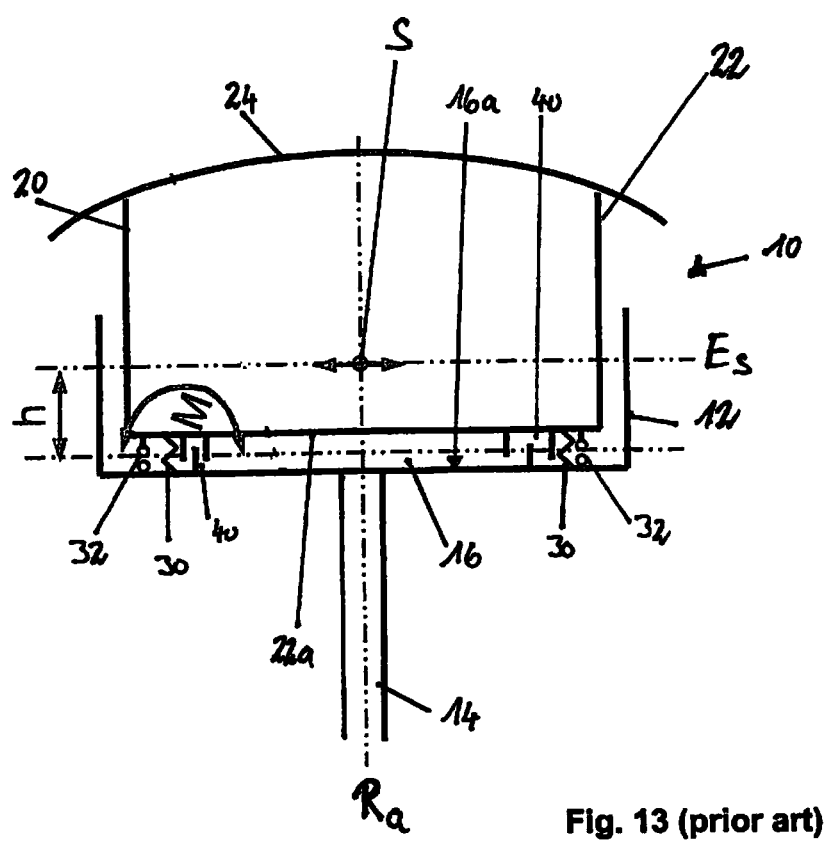

FIG. 13 shows a steering wheel unit 10 which consists of a steering wheel body 12 and an airbag module 20. The axial direction $R_a$ is defined by the steering column 14, which can be connected with the steering wheel unit 10. In the hub area 16 of the steering wheel body 12, the airbag module 20 is accommodated in an accommodation. The airbag module comprises in addition to the illustrated housing 22 and the illustrated cover 24 a gas generator which is not shown, and an airbag folded into housing 22 (also not shown). Between the housing floor 22a and the floor 16a of the hub area of the steering wheel body 12, springs 30 extend so that airbag module 20 can be pressed down against the steering wheel body 12 in axial direction $R_a$. Generally it is also possible to press down the airbag module 20 slightly crossways, in other words not exactly in axial direction. In addition, horn contacts 32 and positioning units 40 are provided on the housing floor 22a and on the floor 16a. These positioning units 40 position the airbag module 20 in non-axial direction, in other words in all directions which are perpendicular to the axial direction $R_a$. Generally, axial positioning units are also present, which position the airbag module 20 in relation to the steering wheel body 12 in axial direction (not shown). The springs 30 are under pretension through these axial positioning units.

If now, during travel, vibrations are transmitted into the airbag module 20 via steering column 14 and steering wheel body 12, the airbag module 20 tries to vibrate in non-axial direction, as shown by the arrows in FIG. 13, which is not possible because of the non-axial positioning units 40. However, since the centre of gravity S lies above the positioning units 40, torques M are exerted on the positioning units, as also indicated in FIG. 13. In the case of a given force in non-axial direction, the torque M affecting a positioning unit 40 is proportional to the distance h of this positioning unit M from the centre of gravity plane $E_S$. These torques M then again lead to the unwanted noises.

DETAILED DESCRIPTION OF PREFERRED EMBODIMENTS

Figure 1:
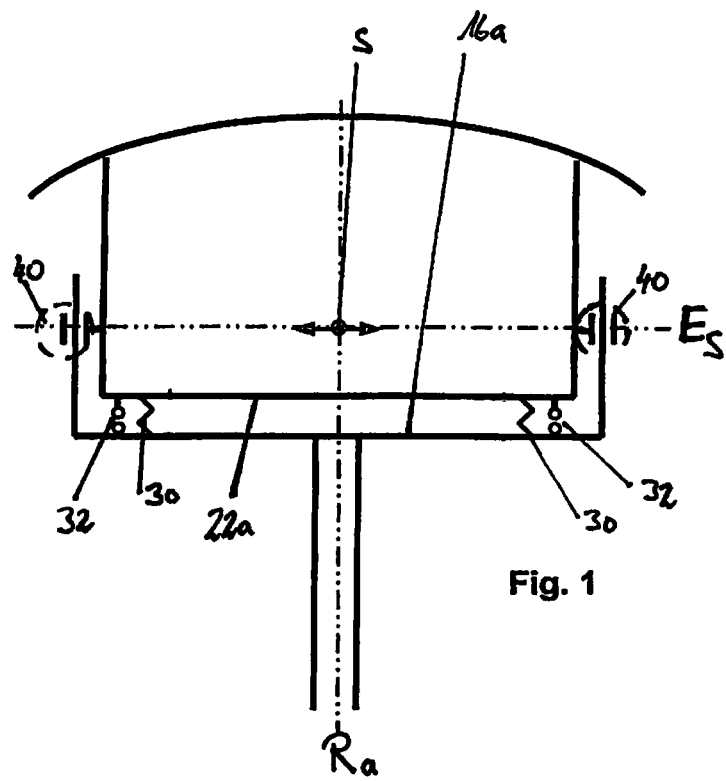
FIG. 1 A first embodiment of the invention in a strongly schematised cross sectional view, FIG. 2 A second embodiment of the invention in a view corresponding to FIG. 1, FIG. 3 A third embodiment of the invention in a view corresponding to FIG. 1, FIG. 4 A fourth embodiment of the invention in a view corresponding to FIG. 1, FIG. 5 An embodiment of the invention, which basically corresponds to FIG. 1, in a view showing a greater wealth of detail, FIG. 6 A section along Plane A-A from FIG. 5, FIG. 7 A section along Plane B-B from FIG. 5, FIG. 8 A positioning unit similar to a positioning unit which can be seen in FIGS. 6 and 7 in a perspective view, FIG. 9 A variation of the positioning unit shown in FIG. 8 in a sectional view, FIG. 10 A further variation of a positioning unit in a view corresponding to FIG. 9, FIG. 11 A birds-eye and schematised view of a steering wheel, FIG. 12 A securing wire in a perspective view in two positions, FIG. 13 Representation of the state of the art in a view corresponding to FIG. 1.
Figure 2:
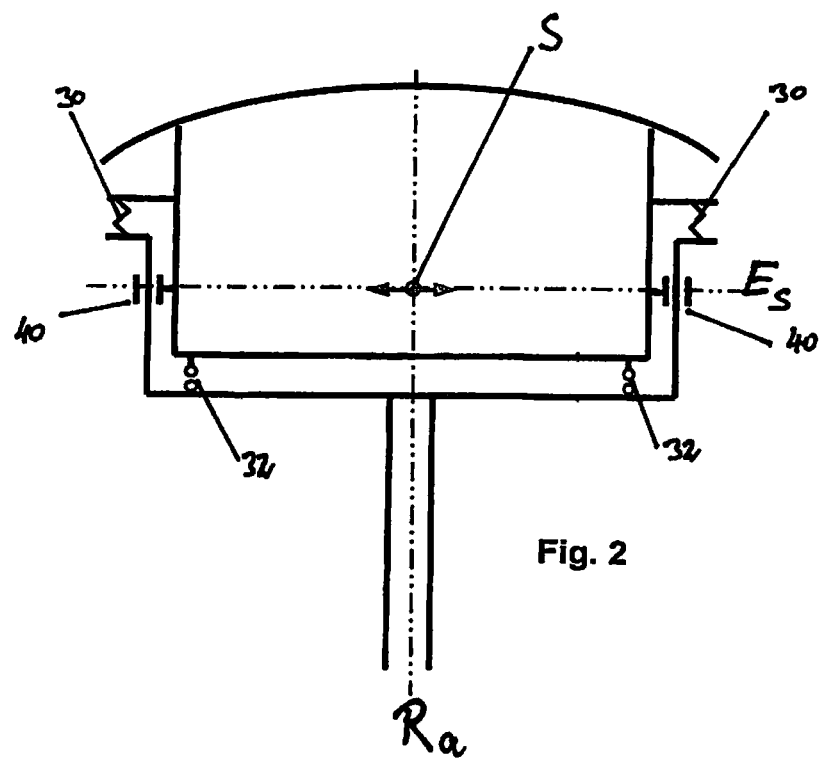
Figure 3:
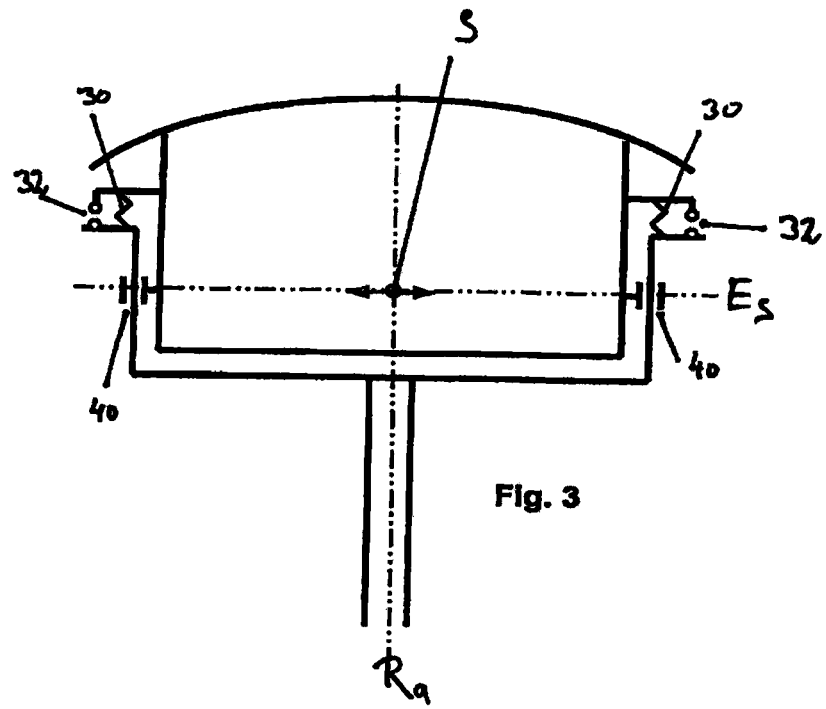
Figure 4:
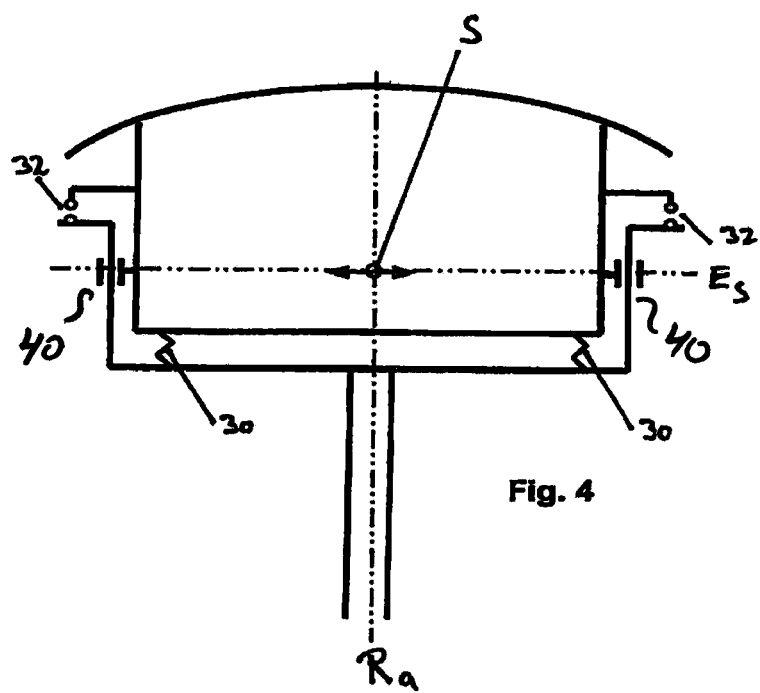

Therefore, according to the invention, and as shown in FIG. 1, the positioning units which act in a non-axial direction are moved to centre of gravity plane $E_S$. In this application under the term "centre of gravity plane" the plane is understood in which the overall centre of gravity S of airbag module 20 lies, and which is perpendicular to the axial direction $R_a$. The position of springs 30 and horn contacts 32 can be freely selected, for example a location between the housing floor 22a and the floor 16a of the hub area is possible, as is shown in FIG. 1. FIGS. 2 to 4 show alternative arrangements of springs 30 and horn contacts 32. It can be seen that these components can be positioned freely at will, which in particular results in the possibility of adapting the arrangement of the springs and the horn contact to the concrete situation as regards the respective steering wheel in question. The positioning units 40 acting in axial direction however always remain in centre of gravity plane $E_S$ and the springs 30 are at a distance from the positioning units 40 and preferably do not lie in the centre of gravity plane $E_S$.

Figure 5:
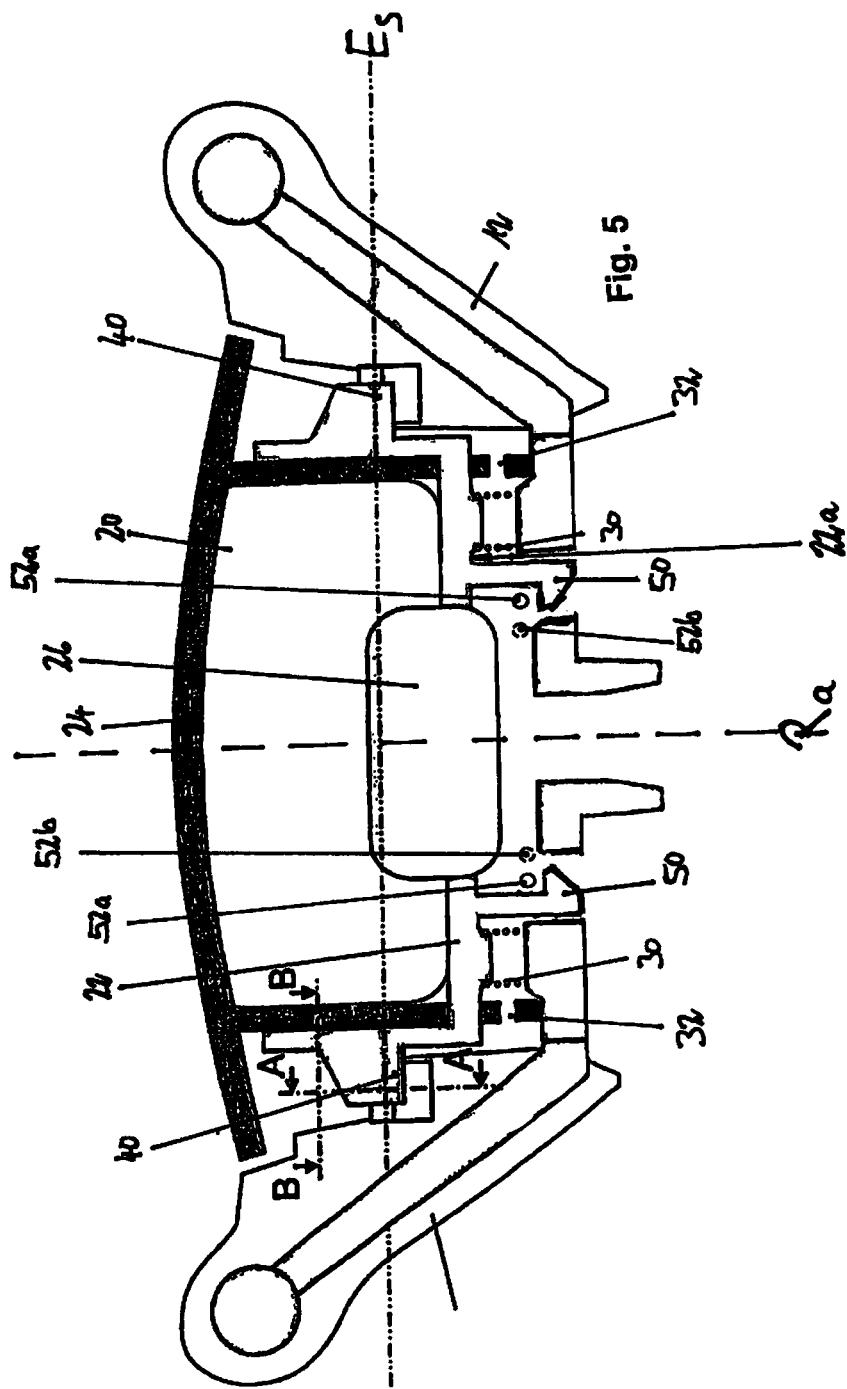

FIG. 5 shows a steering wheel unit, as shown in FIG. 1, in a greater wealth of detail. In FIG. 5 one recognises the steering wheel body 12, which basically consists of a metal skeleton covered in foam, the airbag module 20, which in addition to the housing 22 and the cover 24 also exhibits a gas generator 26, springs 30, horn contacts 32 and positioning units 40. Two positioning units 40 are shown in FIG. 5, in general three positioning units are present, as will be to explained later with reference to FIG. 11. The concrete structure of positioning units will be described later in more detail with reference to FIGS. 6 to 10.

In the preferred embodiment shown, the positioning units 40 are formed in such a way that they position the airbag module 20 in both non-axial and axial direction. However, they are not formed in such a stable way that they can securely resist the forces which occur during expansion of the airbag, which is why additional securing elements are provided. These securing elements consist of securing hooks 50, which in the embodiment shown extend from housing floor 22a downwards, and a horseshoe-shaped securing wire 52, which is held on the floor of the hub area. FIG. 5 shows the front end sections of the securing wire 52, whereby the quiescent state 52a is shown in solid lines and a position 52b swivelled to the inside is shown in broken lines. The position swivelled to the inside only serves so that the airbag module 20 can be disassembled from the steering wheel body 12. From FIG. 5 it can be seen that securing hooks 50 and securing wire 52 do not touch each other in normal operation; these components therefore do not make a contribution to the positioning of the airbag module in the steering wheel body 12. But if during expansion of the airbag, when the positioning units 40 are broken as the case may be, the securing hooks 50 hit the securing wire 52, the securing hooks come to rest on the securing wire and it is prevented that the airbag module 20 de-attaches from the steering wheel body.

Figure 12:
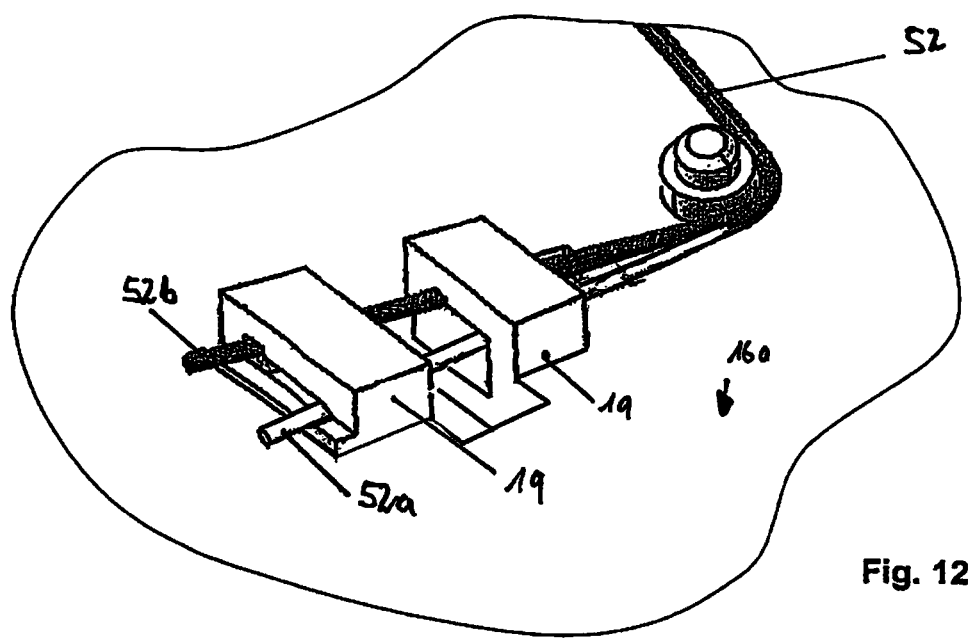

FIG. 12 shows, in perspective view, a front end area of the securing wire 52 in its outer quiescent position 52a and in its position swivelled to the inside 52b, into which it can be brought with the help of a tool acting from the outside (not shown). The securing wire 52 is secured by means of retaining blocks 19 rigidly connected with the floor 16a of the hub area 16. In its inner position, securing wire 52 is kept in retaining blocks 19 by means of grooves. When the airbag module is assembled on the steering wheel body the securing wire is pressed to the inside by the securing hooks 50, however not so far that it can slot into the grooves. When the airbag module is completely assembled, the securing wire snaps into its outer position and can then fulfil its securing function. The arrangement in the area of the other end of the securing wire is a mirror image of FIG. 12.

The structure of positioning units 40 is now described with reference to FIGS. 6 to 8. The positioning units 40 exhibit a positioning element on the steering wheel side in the form of a receiving element 45 and a positioning element on the module side in the form of a plate-shaped guide element 42.

Figure 6:
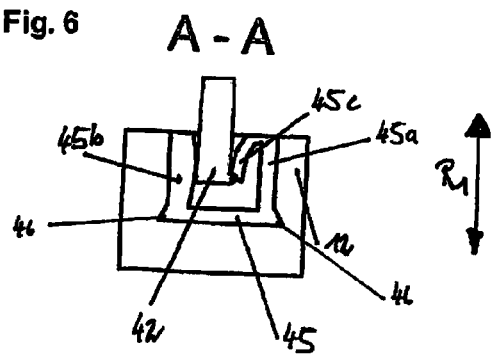
Figure 7:
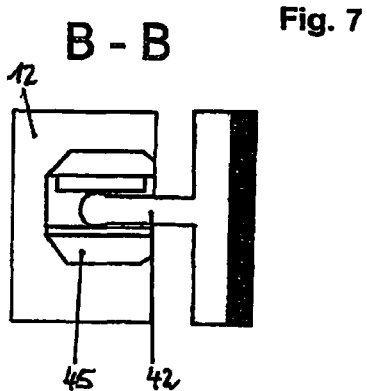
Figure 8:
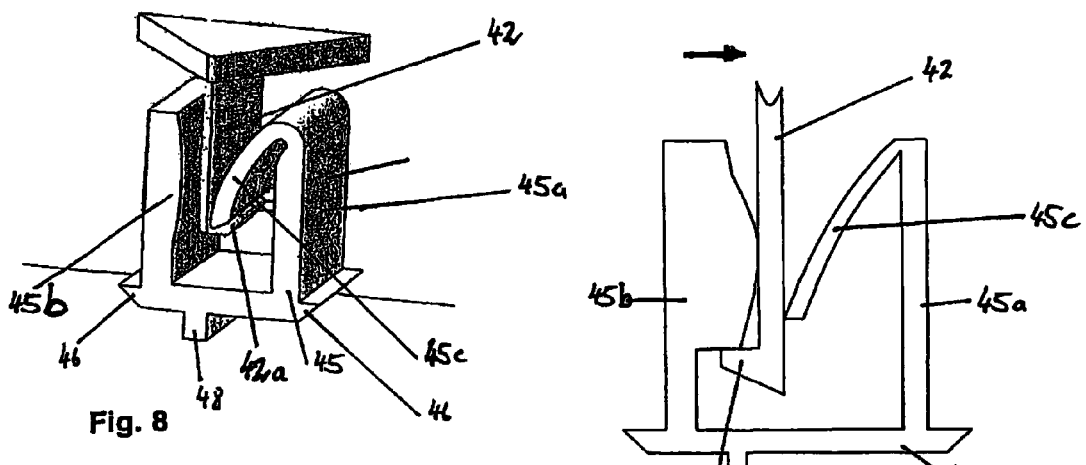

Such a plate-shaped guide element 42 and a receiving element 45 in mounted conditions are shown in FIGS. 6 and 7 schematically in a section and in FIG. 8 in a perspective view. The receiving element 45 has a basically U-shaped cross-section, whereby an elastic arm 45c extends from an upper end of a first leg 45a into the inside of the U. The inner side of the second leg 45b lying opposite the first leg 45a is of convex shape. The minimum distance between elastic arm 45c and second leg 45b is, in force-free condition, smaller than the thickness of the plate-shaped guide element 42 in the shape of a plate, so that in assembled state the plate-shaped guide element 42 is pressed onto the second leg, which leads to positional fixing in the non-axial plane, however in only exactly one direction, which is designated with $R_1$ in FIG. 7.

The positioning units also serve for positioning in axial direction. In order to achieve this, the lower ends of the guide elements 42 are shaped in the form of hooks, so that the hook sections 42a formed in this way are pressed against the undersides of elastic arms 45c due to the force of the springs. During assembly of the airbag module into the steering wheel, the arms are first pushed to one side by hook sections 42a of plate-shaped guide elements 42 and then snap back. The guide elements 42 preferably consist of plastic.

The receiving elements are preferably separate elements of plastic, which are located with a form fit into recesses in the steering wheel body intended for this purpose. The elements which create the form fit are overhangs 46. A peg 48 located eccentrically (not shown in FIG. 6) is provided on the lower leg of U-shaped receiving element 45, in order to ensure that receiving element 45 can only be inserted into the corresponding recess in the correct orientation.

The steering wheel body is somewhat elastic in the area of the recesses in which the receiving elements 45 are held (for example through the use of a foam material), so that the receiving elements can be clipped out of the steering wheel body for disassembly purposes, by pulling them out in axial direction. They have is to be clipped into the foam again before re-assembly.

Figure 9:
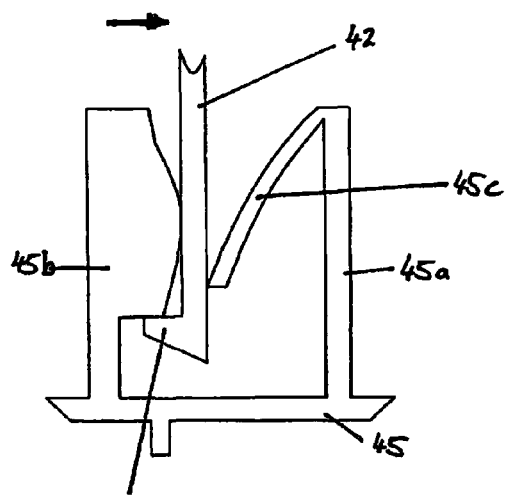
Figure 10:
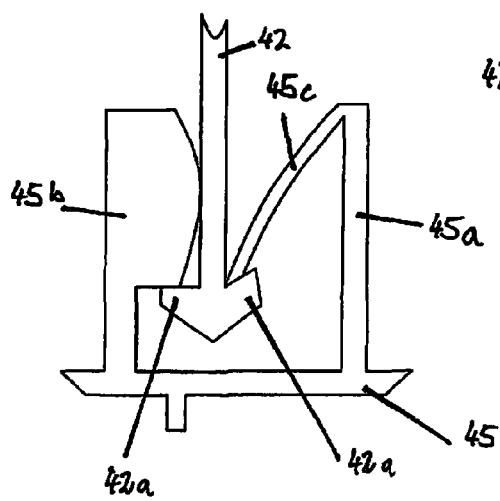

FIGS. 9 and 10 show variants of the elements shown in FIG. 6. In the variant of FIG. 9, the hook section 42a of guide element 42 points in the direction of the second leg 45b of receiving element 45, which exhibits a step. The advantage of this variant is that it is possible to unclip the hook sections 42a by means of a combined rotary (see arrow in FIG. 9) and pulling movement (presuming that all pairs of guide elements 42 and receiving elements 45 in the steering unit have the same orientation, which is preferred).

In the variant shown in FIG. 10, the guide element 42 has hook sections 42a on both sides. This arrangement makes it easier to pull the receiving elements out of the foam of a steering wheel body, as the tensile force which is exerted on the housing is transferred more symmetrically to the receiving elements.

If a solution is selected in which the at least one hook section 42a of the plate-shaped guide element points in the direction of elastic arm 45c, it is to be preferred that the upper surface of this hook element 42a extends upwards at a slope from the guide element, which can be seen particularly in FIG. 10. The underside of elastic arm 45c should follow this slope. In this design, the force of the springs 30 help the elastic arm to be pressed against the guide element 42. In this case, the clamping force eliminates each gap between guide element 42 and the receiving element 45. This is very helpful in order to further minimise noises in case of vibratory loading.

Figure 11:
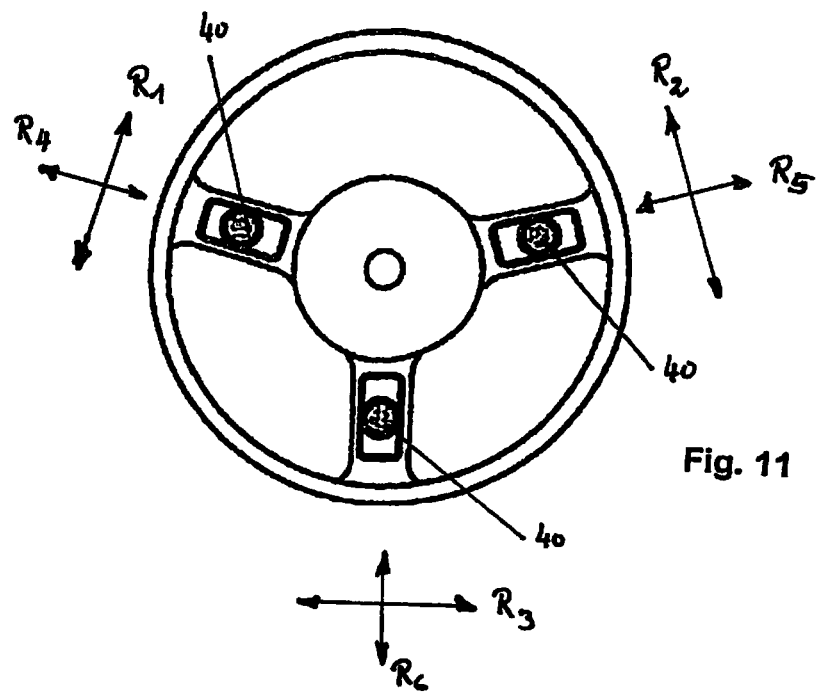

FIG. 11 shows a steering wheel from above in schematic form and the position of positioning units 40. It can be seen that each positioning unit only precisely defines one non-axial position in precisely one direction ($R_1$ to $R_3$) while it does not define the position in the non-axial direction perpendicular to this ($R_4$ to $R_6$). By these means on the one hand a static over-determination is avoided and on the other hand compensation of ageing- or temperature-related changes in size of the airbag module is possible, so that the airbag module is held on the steering wheel body free of clearance.

LIST OF REFERENCE NUMBERS 10 steering wheel unit
12 steering wheel body
14 steering column
16 hub area
16a floor of hub areas
20 airbag module
22 housing
22a housing floor
24 cover
26 gas generator
30 spring
32 horn contact
40 positioning unit
42 plate-shaped guide element
42a hook section
45 receiving element
45a first leg
45b second leg
45c elastic arm
46 overhang
48 peg
50 securing hook
52 securing wire
52a quiescent position
52b position swivelled to the inside

The invention claimed is:

1. A steering wheel unit comprising:
an airbag module and a steering wheel body connectable to a steering column defining an axial direction, the steering wheel body including an accommodation for the airbag module in a hub area, the airbag module able to be pressed down against the steering wheel body against a force of at least one spring; and
at least two positioning units acting between the airbag module and the steering wheel body, which are arranged in a center of gravity plane perpendicular to the axial direction, the at least two positioning units acting at least in a non-axial direction;
wherein the at least one spring is spaced from the at least two positioning units;
wherein each positioning unit acts in exactly one first non-axial direction and does not have any positioning effect in a second non-axial direction which is perpendicular to the first non-axial direction.

2. The steering wheel unit according to claim 1, wherein the at least two positioning units include exactly three positioning units.

3. The steering wheel unit according to claim 1, wherein each positioning unit includes a guide element and a receiving element in which the guide element is guided.

4. The steering wheel unit according to claim 3, wherein the receiving elements are U-shaped with two legs and an arm extends into the inside of the U from at least one leg.

5. The steering wheel unit according to claim 4, wherein the guide elements are generally plate-shaped.

6. The steering wheel unit according to claim 1, wherein the positioning units also serve for the axial positioning.

7. The steering wheel unit according to claim 6, wherein each positioning unit includes a guide element and a receiving element in which the guide element is guided, and further wherein the guide elements exhibit hook sections.

8. The steering wheel unit according to claim 7, wherein the guide elements are clipped into the receiving elements.

9. The steering wheel unit according to claim 1, further comprising securing elements which are ineffective in normal operating condition but which hold the airbag module on the steering wheel body on triggering of a gas generator.

* * * * *